United States Patent
Fang et al.

(10) Patent No.: US 11,861,118 B2
(45) Date of Patent: Jan. 2, 2024

(54) TOUCH DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventors: Liang Fang, Wuhan (CN); Ningkun Peng, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 342 days.

(21) Appl. No.: 17/254,251

(22) PCT Filed: Jul. 29, 2020

(86) PCT No.: PCT/CN2020/105436
§ 371 (c)(1),
(2) Date: Dec. 18, 2020

(87) PCT Pub. No.: WO2022/007055
PCT Pub. Date: Jan. 13, 2022

(65) Prior Publication Data
US 2022/0283672 A1    Sep. 8, 2022

(30) Foreign Application Priority Data
Jul. 9, 2020   (CN) .......................... 202010654467.3

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01)

(58) Field of Classification Search
CPC ..................................... G06F 3/0443
See application file for complete search history.

(56) References Cited

U.S. PATENT DOCUMENTS 10,509,509 B2 *  12/2019  Xie ........................ G06F 3/0446
2012/0026128 A1   2/2012  Chen et al.
(Continued)

FOREIGN PATENT DOCUMENTS

| CN | 104793820 A | 7/2015 |
| CN | 105912182 A | 8/2016 |

(Continued)

OTHER PUBLICATIONS

International Search Report in International application No. PCT/CN2020/105436, dated Apr. 14, 2021.
(Continued)

*Primary Examiner* — Robin J Mishler
(74) *Attorney, Agent, or Firm* — PV IP PC; Wei Te Chung; Zhigang Ma

(57) ABSTRACT

A touch display panel at least includes a plurality of touch signal lines, the touch signal lines includes a first type touch signal line and a second type touch signal line, and a distance between a first end of the first type touch signal line and a touch integrated circuit is less than a distance between a first end of the second type touch signal line and the touch integrated circuit. The first type touch signal line includes a single sub-signal line, and the second type touch signal line includes at least two sub-signal lines.

14 Claims, 2 Drawing Sheets

(56) References Cited

U.S. PATENT DOCUMENTS

| | | | |
|---|---|---|---|
| 2012/0327569 A1 | 12/2012 | Park et al. | |
| 2018/0227540 A1* | 8/2018 | Stolitzka | G09G 3/2074 |
| 2020/0174609 A1* | 6/2020 | Yoo | G06F 3/0446 |

FOREIGN PATENT DOCUMENTS

| | | |
|---|---|---|
| CN | 106959783 A | 7/2017 |
| CN | 107340921 A | 11/2017 |
| CN | 107390942 A | 11/2017 |
| CN | 206649492 U | 11/2017 |
| CN | 108874227 A | 11/2018 |
| CN | 109725770 A | 5/2019 |
| JP | 2016095615 A | 5/2016 |
| TW | 200945149 A | 11/2009 |

OTHER PUBLICATIONS

Written Opinion of the International Search Authority in international application No. PCT/CN2020/105436, dated Apr. 14, 2021.

\* cited by examiner

TOUCH DISPLAY PANEL

RELATED APPLICATIONS

This application is a Notional Phase of PCT Patent Application No. PCT/CN2020/105436 having international filing date of Jul. 29, 2020, which claims the benefit of priority of Chinese Patent Application No. 202010654467.3 filed on Jul. 9, 2020. The contents of the above applications are all incorporated by reference as if fully set forth herein in their entirety.

FIELD OF INVENTION

The present disclosure relates to the field of display technology, and more particularly, to a touch display panel.

BACKGROUND OF INVENTION

Display devices mainly include liquid crystal displays (LCDs), plasma display panels (PDPs), organic light-emitting diodes (OLEDs), and active matrix organic light-emitting diodes (AMOLEDs), which are widely applied in vehicles, mobile phones, tablets, computers, and television products.

With rapid development of display technology, touch display technology has gradually spread throughout people's lives. In current touch display panels, compared with resistive touch display panels, capacitive touch display panels have advantages of long lifespan, high light transmittance, and support for multi-touch, making them been popular in touch display technology.

A touch detecting principle of capacitive touch display panels is that touch driving electrodes and touch sensing electrodes arranged in a crisscross are formed in the touch display panel, and a capacitance matrix is formed at an intersection, then a driving chip provides touch detecting signals to each touch driving electrode, and sequentially detects touch sensing signals output by the touch sensing electrodes corresponding to each touch driving electrode, thereby detecting capacitance change in a capacitance matrix and determining touch positions.

Generally, due to different positions of the touch sensing electrodes distributed in the panel, a length of each touch sensing signal line in the touch display panel will also be different, resulting in different impedance of each touch sensing signal line. When the aforementioned touch sensing electrodes output the touch sensing signals through the touch signal lines electrically connected to thereof, the aforementioned difference in impedance may cause different time delays when different touch signal lines output the touch sensing signals, thereby affecting poor uniformity of touch sensitivity of the touch display panel.

SUMMARY OF INVENTION

In current touch display panels, due to different positions of the touch sensing electrodes distributed in the panel, a length of each touch sensing signal line in the touch display panel will also be different, resulting in different impedance of each touch sensing signal line, so that different touch signal lines will have different time delays when outputting touch sensing signals, thereby affecting a technical problem of poor uniformity of touch sensitivity of the touch display panel.

The present disclosure provides a touch display panel, which can significantly reduce the impedance of the touch signal lines electrically connected to remote touch sensing blocks, and improve speed of touch driving signal transmission.

In order to realize the above purpose, an embodiment of the present disclosure uses technical solutions as follows:

The embodiment of the present disclosure provides a touch display panel comprising a display region and a fan-shaped wiring region positioned below the display region. The touch display panel comprises a base substrate, a touch electrode layer formed on the base substrate, and a plurality of touch signal lines.

Wherein, each of the touch sensing blocks is electrically connected to one of the touch signal lines, and the touch signal lines extend along a row direction. The touch electrode layer comprises a plurality of touch sensing blocks arranged in an array. A first end of the touch signal lines is electrically connected to a corresponding touch sensing block, and a second end of the touch signal lines extends to the fan-shaped wiring region and is electrically connected to a touch integrated circuit located in the fan-shaped wiring region. The touch signal lines comprise a first type touch signal line and a second type touch signal line, and a distance between a first end of the first type touch signal line and the touch integrated circuit is less than a distance between a first end of the second type touch signal line and the touch integrated circuit. The first type touch signal line includes a single sub-signal line, and the second type touch signal line includes at least two sub-signal lines.

In the touch display penal provided by the embodiment of the present disclosure, a number of the touch sensing blocks arranged along the row direction is N, a number of the first type touch signal line corresponding to the touch sensing blocks is P, and a number of the second type touch signal line corresponding to the touch sensing blocks is Q, wherein N, P, and Q are all positive integers, and N=P+Q.

In the touch display penal provided by the embodiment of the present disclosure, when N=2n, P=Q=n, and when N=2n+1, P=n+1, and Q=n, wherein n is a positive integer.

In the touch display penal provided by the embodiment of the present disclosure, each row of the touch signal lines comprises a blind region in a column direction, a blind region width of the blind region is W, and a number of the touch signal lines in one blind region is t, wherein t is a positive integer and t≤N.

In the touch display penal provided by the embodiment of the present disclosure, the touch display panel further comprises a pixel array layer, the pixel array layer comprises a plurality of sub-pixel units arranged in an array, and the sub-pixel units are one of a red sub-pixel unit, a green sub-pixel unit, or a blue sub-pixel unit In the touch display penal provided by the embodiment of the present disclosure, each vertical projection of each of the touch sensing blocks on the pixel array layer covers the plurality of sub-pixel units, and each vertical projection of the touch signal lines on the pixel array layer is located between two adjacent rows of the sub-pixel units.

In the touch display penal provided by the embodiment of the present disclosure, a pixel arrangement of the sub-pixel units is a diamond pixel arrangement or a 2-in-1 pixel arrangement.

In the touch display penal provided by the embodiment of the present disclosure, the touch sensing blocks and the touch signal lines are both formed of a same metal layer, and the touch signal lines are grid metal patterns.

In the touch display penal provided by the embodiment of the present disclosure, the touch integrated circuit is configured to provide touch driving signals and detect touch signals.

The embodiment of the present disclosure further provides a touch display panel comprising a display region and a fan-shaped wiring region positioned below the display region. The touch display panel comprises a base substrate, a touch electrode layer formed on the base substrate, and a plurality of touch signal lines.

Wherein, the touch electrode layer comprises a plurality of touch sensing blocks arranged in an array. A first end of the touch signal lines is electrically connected to a corresponding touch sensing block, and a second end of the touch signal lines extends to the fan-shaped wiring region and is electrically connected to a touch integrated circuit located in the fan-shaped wiring region. The touch signal lines comprise a first type touch signal line and a second type touch signal line, and a distance between a first end of the first type touch signal line and the touch integrated circuit is less than a distance between a first end of the second type touch signal line and the touch integrated circuit. The first type touch signal line includes a single sub-signal line, and the second type touch signal line includes at least two sub-signal lines.

In the touch display penal provided by the embodiment of the present disclosure, a number of the touch sensing blocks arranged along the row direction is N, a number of the first type touch signal line corresponding to the touch sensing blocks is P, and a number of the second type touch signal line corresponding to the touch sensing blocks is Q, wherein N, P, and Q are all positive integers, and N=P+Q.

In the touch display penal provided by the embodiment of the present disclosure, when N=2n, P=Q=n, and when N=2n+1, P=n+1, and Q=n, wherein n is a positive integer.

In the touch display penal provided by the embodiment of the present disclosure, each row of the touch signal lines comprises a blind region in a column direction, a blind region width of the blind region is W, and a number of the touch signal lines in one blind region is t, wherein t is a positive integer and t≤N.

In the touch display penal provided by the embodiment of the present disclosure, the touch display panel further comprises a pixel array layer, the pixel array layer comprises a plurality of sub-pixel units arranged in an array, and the sub-pixel units are one of a red sub-pixel unit, a green sub-pixel unit, or a blue sub-pixel unit In the touch display penal provided by the embodiment of the present disclosure, each vertical projection of each of the touch sensing blocks on the pixel array layer covers the plurality of sub-pixel units, and each vertical projection of the touch signal lines on the pixel array layer is located between two adjacent rows of the sub-pixel units.

In the touch display penal provided by the embodiment of the present disclosure, a pixel arrangement of the sub-pixel units is a diamond pixel arrangement or a 2-in-1 pixel arrangement.

In the touch display penal provided by the embodiment of the present disclosure, the touch sensing blocks and the touch signal lines are both formed of a same metal layer, and the touch signal lines are grid metal patterns.

In the touch display penal provided by the embodiment of the present disclosure, the touch integrated circuit is configured to provide touch driving signals and detect touch signals.

Compared with the prior art, in the touch display panel provided by the embodiment of the present disclosure, the touch signal lines close to the touch integrated circuit are disposed as the single sub-signal line, and the touch signal lines away from the touch integrated circuit are disposed as at least two sub-signal lines, which significantly reduces the impedance of the touch signal lines away from the touch integrated circuit, resolves a difference in touch performance caused by the impedance of the touch signal lines, and improves speed of touch driving signal transmission. Moreover, this ensures touch performance without changing a size of the blind region.

DETAILED DESCRIPTION OF PREFERRED EMBODIMENTS

Embodiments of the present disclosure are directed to current touch display panels, due to different positions of the touch sensing electrodes distributed in the panel, a length of each touch sensing signal line in the touch display panel will also be different, resulting in different impedance of each touch sensing signal line. The aforementioned difference in impedance may cause different time delays when different touch signal lines output the touch sensing signals, thereby affecting poor uniformity of touch sensitivity of the touch display panel. The present embodiments can solve the defects.

Figure 1:
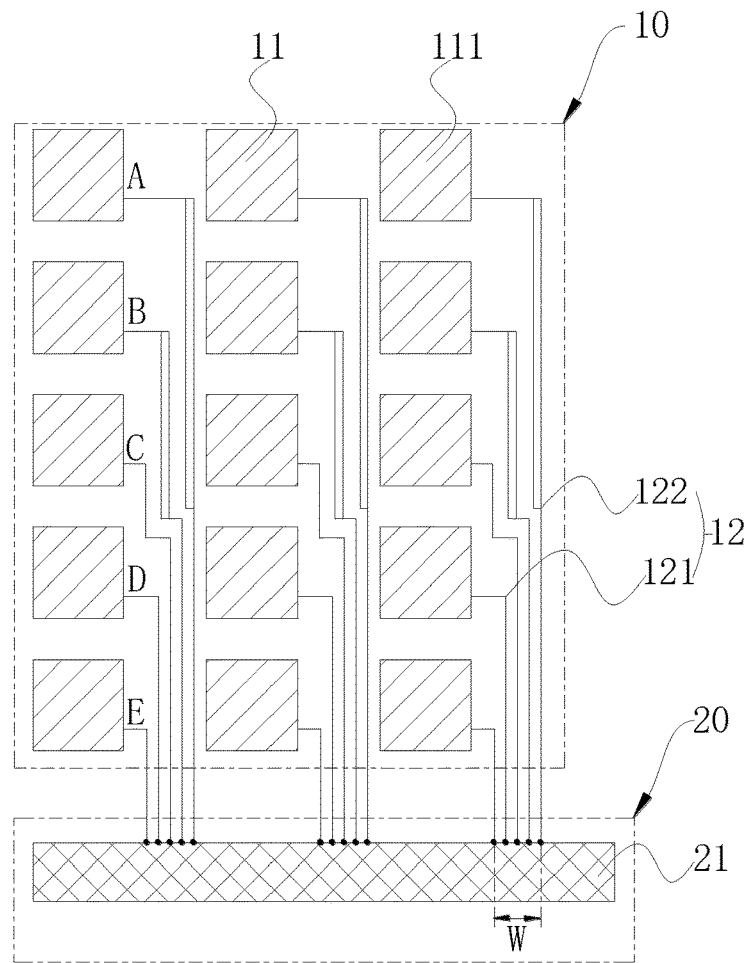
FIG. 1 is a schematic diagram of a planar structure of a touch display panel provided by an embodiment of the present disclosure.
Figure 2:
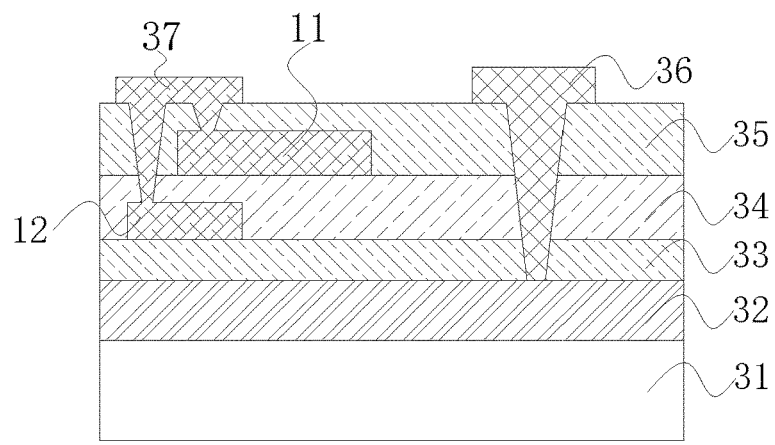
FIG. 2 is a schematic diagram of a cross-sectional structure of the touch display panel provided by the embodiment of the present disclosure.

As shown in FIG. 1, FIG. 1 is a schematic diagram of a planar structure of a touch display panel provided by an embodiment of the present disclosure. As shown in FIG. 2, FIG. 2 is a schematic diagram of a cross-sectional structure of the touch display panel provided by the embodiment of the present disclosure. Refer to FIG. 1 and FIG. 2, a touch display panel provided by the embodiment of the present disclosure comprises a display region 10 and a fan-shaped wiring region 20 below the display region 10, the touch display panel further comprises a base substrate 31, a touch electrode layer 11 formed on the base substrate 31, and a plurality of touch signal lines 12.

Wherein, the touch electrode layer 11 comprises a plurality of touch sensing blocks 111 arranged in an array. A first end of the touch signal lines 12 is electrically connected to a corresponding touch sensing block 111, and a second end of the touch signal lines extends to the fan-shaped wiring region 20 and is electrically connected to a touch integrated circuit 21 located in the fan-shaped wiring region 20. The touch signal lines 12 comprise a first type touch signal line 121 and a second type touch signal line 122, and a distance between a first end of the first type touch signal line 121 and the touch integrated circuit 21 is less than a distance between a first end of the second type touch signal line 122 and the touch integrated circuit 21. The first type touch signal line 121 includes a single sub-signal line, and the second type touch signal line 122 is at least two sub-signal lines. It should be noted that a number of the sub-signal lines used in the second type of touch signal line 122 can be determined according to the actual product size and space, which is not limited herein. However, the present disclosure is preferably two, which can effectively reduce a resistance of the second type touch signal line 122 without occupying space.

Specifically, continuing to refer to FIG. 2, the touch display panel provided by the embodiment of the present disclosure further comprises a thin film transistor array structure layer 32 located on a side of the base substrate 31, a planarization layer 33 covering the thin film transistor array structure layer 32, the touch signal lines 12 disposed on a surface of a side of the planarization layer 33 away from the base substrate 31, a first insulating layer 34 covering the planarization layer 33 and the touch signal lines 12, the touch electrode layer 11 disposed on the first insulating layer 34 and away from a surface of a side of the base substrate 31, a second insulating layer 35 covering the touch electrode layer 11 and the first insulating layer 34, and a pixel electrode 36 disposed on a surface of a side of the second insulating layer 35 away from the base substrate 31. The pixel electrode 36 is electrically connected to the thin film transistor array structure layer 32 through a through-hole, and the touch signal lines 12 are electrically connected to the touch electrode layer 11 through a bridge 37, wherein the bridge 37 and the pixel electrode 36 can formed on a same layer.

Preferably, the touch electrode layer 11 may also be a common electrode layer. Wherein, during a touch stage, the touch electrode layer 11 receives a touch drive signal; and during a display stage, the touch electrode layer 11 receives a common voltage.

Specifically, each of the touch sensing blocks 111 is electrically connected to one of the touch signal lines 12, and the touch signal lines 12 extend along a row direction.

Furthermore, a number of the touch sensing blocks 111 arranged along the row direction is N, a number of the first type touch signal line 121 corresponding to the touch sensing blocks is P, and a number of the second type touch signal line 122 corresponding to the touch sensing blocks is Q, wherein N, P, and Q are all positive integers, and N=P+Q. In the preferred embodiment shown in FIG. 1, the number N of the touch sensing blocks 111 arranged along the row direction is 5, the number P of the first type touch signal line 121 corresponding to the touch sensing blocks is 3 (the first type touch signal line 121 comprises a touch signal line C, a touch signal line D, and a touch signal line E), and the number Q of the second type touch signal line 122 corresponding to the touch sensing blocks is 2 (the second type touch signal line 122 comprises a touch signal line A and a touch signal line B).

Go a step further, when N=2n (that is, the number N of the touch sensing blocks 111 arranged along the row direction is an even), P=Q=n; and when 2n+1 (that is, the number N of the touch sensing blocks 111 arranged along the row direction is an odd), P=n+1, Q=n, and n is a positive integer. In the preferred embodiment shown in FIG. 1, the number N of the touch sensing blocks 111 arranged along the row direction is 5, and n is 2. The number P of the first type touch signal line 121 corresponding to the touch sensing blocks is 3 (the first type touch signal line 121 comprises a touch signal line C, a touch signal line D, and a touch signal line E), and the number Q of the second type touch signal line 122 corresponding to the touch sensing blocks is 2 (the second type touch signal line 122 comprises a touch signal line A and a touch signal line B).

Specifically, each row of the touch signal lines 12 (that is, a direction perpendicular to the touch signal lines 12) comprises a blind region in a column direction, a blind region width of the blind region is W, and a number of the touch signal lines 12 in one blind region is t, wherein t is a positive integer and t≤N.

Specifically, the touch display panel comprises a pixel array layer, the pixel array layer comprises a plurality of sub-pixel units arranged in an array, and the sub-pixel units are one of a red sub-pixel unit, a green sub-pixel unit, or a blue sub-pixel unit. Each vertical projection of each of the touch sensing blocks 111 on the pixel array layer covers the plurality of sub-pixel units. Preferably, a pixel arrangement of the sub-pixel units is a diamond pixel arrangement or a 2-in-1 pixel arrangement.

Figure 3:
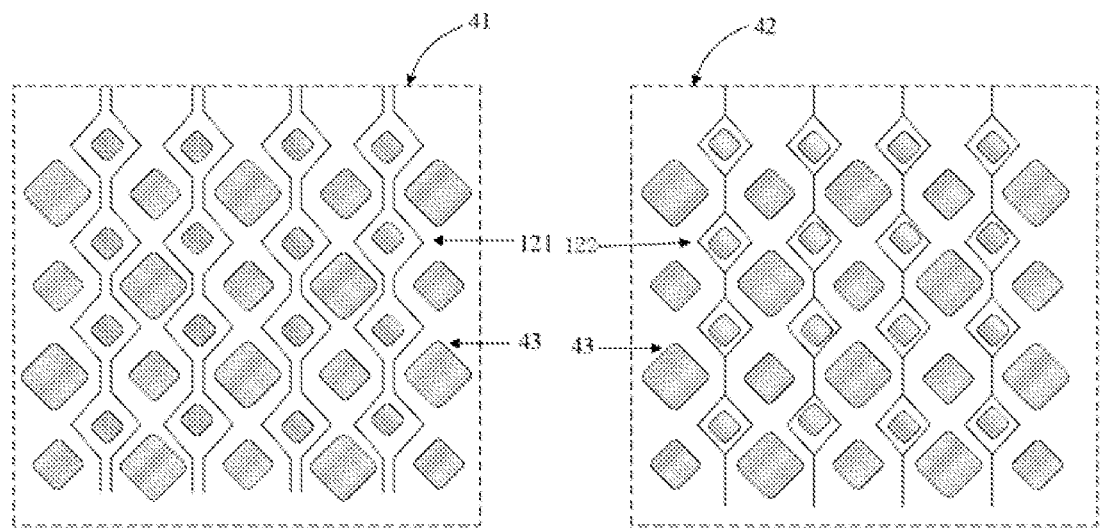
FIG. 3 is a schematic design diagram of touch signal lines in the touch display panel provided by the embodiment of the present disclosure based on a diamond pixel arrangement.

As shown in FIG. 3, FIG. 3 is a schematic design diagram of touch signal lines in the touch display panel provided by the embodiments of the present disclosure based on the diamond pixel arrangement. Wherein, when the sub-pixel units 43 use the diamond pixel arrangement, in a first region 41 of the first type touch signal line 121 close to the touch integrated circuit 21, the first type touch signal line 121 is a grid metal pattern and uses the single sub-signal line. Each vertical projection of the first type touch signal line 121 on the pixel array layer is located between two adjacent rows of the sub-pixel units 43, and a main purpose is to prevent the sub-pixel units 43 from reducing an influence of the single sub-signal line on display light transmittance. In a second region 42 of the second type touch signal line 122 close to the touch integrated circuit 21, the second type touch signal line 122 is a grid metal pattern and uses at least two sub-signal lines. Each vertical projection of the second type touch signal line 122 on the pixel array layer is located between two adjacent rows of sub-pixel units 43, and a main purpose is to prevent the sub-pixel unit 43 from reducing an influence of the at least two sub-signal lines on display light transmittance. A unit impedance when the second type touch signal line 122 uses the at least two sub-signal lines is less than A unit impedance when the second type touch signal line 122 uses the single sub-signal line.

Figure 4:
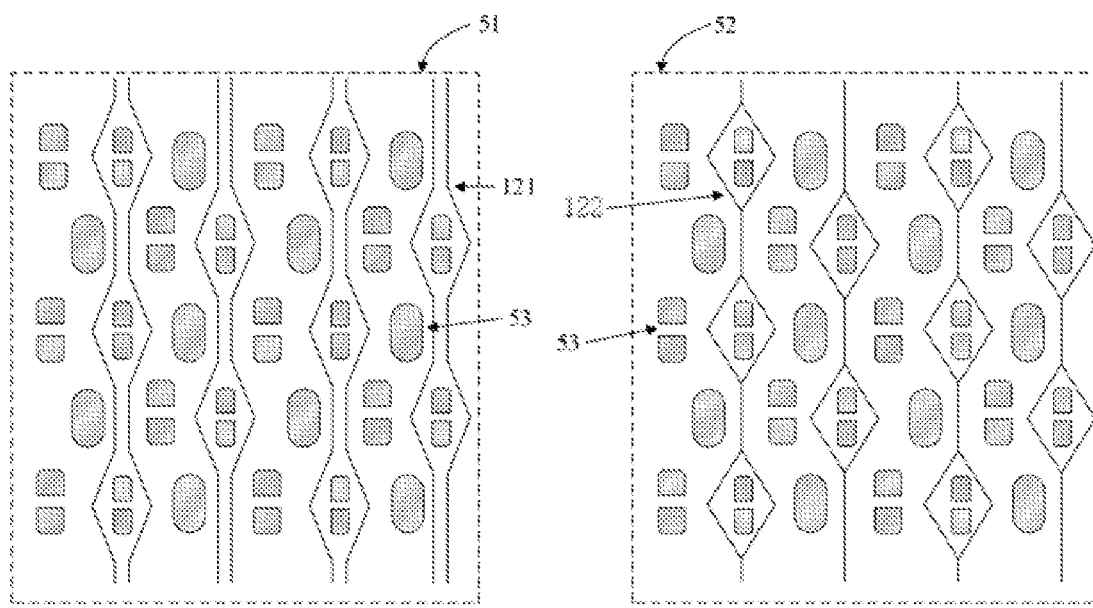
FIG. 4 is a schematic design diagram of the touch signal lines in the touch display panel provided by the embodiment of the present disclosure based on a 2-in-1 pixel arrangement.

As shown in FIG. 4, FIG. 4 is a schematic design diagram of the touch signal lines in the touch display panel provided by the embodiments of the present disclosure based on the 2-in-1 pixel arrangement. Wherein, when the sub-pixel units 53 use the 2-in-1 pixel arrangement, in the first region 41 of the first type touch signal line 121 close to the touch integrated circuit 21, the first type touch signal line 121 is a grid metal pattern and uses the single sub-signal line. Each vertical projection of the first type touch signal line 121 on the pixel array layer is located between two adjacent rows of the sub-pixel units 53, and a main purpose is to prevent the sub-pixel units 53 from reducing the influence of the single sub-signal line on display light transmittance. In the second region 42 of the second type touch signal line 122 close to the touch integrated circuit 21, the second type touch signal line 122 is a grid metal pattern and uses at least two sub-signal lines. Each vertical projection of the second type touch signal line 122 on the pixel array layer is located between two adjacent rows of sub-pixel units 53, and a main purpose is to prevent the sub-pixel units 53 from reducing the influence of the at least two sub-signal lines on display light transmittance. A unit impedance when the second type touch signal line 122 uses the at least two sub-signal lines is less than A unit impedance when the second type touch signal line 122 uses the single sub-signal line.

According to a resistance principle, a length of the second type touch signal line 122 is greater than a length of the first type touch signal line 121, and a corresponding impedance R of the second type touch signal line 122 is greater. The embodiment of the present disclosure uses a differentiated design method for the touch signal lines, the touch signal lines away from the touch integrated circuit is designed as the at least two sub-signal lines, the touch signal lines close to the touch integrated circuit is designed as the single sub-signal line, which significantly reduces the impedance of the touch signal lines away from the touch integrated circuit, resolves a difference in touch performance caused by the impedance of the touch signal lines, and improves speed of touch driving signal transmission. Moreover, this ensure touch performance without changing a size of the blind region.

For specific implementations of the above operations, referring to the previous embodiments, which will not be described here.

In summary, in the touch display panel provided by the embodiment of the present disclosure, the touch signal lines close to the touch integrated circuit are disposed as the single sub-signal line, and the touch signal lines away from the touch integrated circuit are disposed as at least two sub-signal lines, which significantly reduces the impedance of the touch signal lines away from the touch integrated circuit, relieves the difference in touch performance caused by the impedance of the touch signal lines, and improves the speed of touch driving signal transmission. Moreover, this ensures touch performance without changing the size of the blind region.

It should be understood that for those of ordinary skill in the art, equivalent replacements or changes can be made according to technical solutions of the present disclosure and its inventive concept, and all these changes or replacements shall fall within a protection scope of appended claims of the present disclosure.

What is claimed is:

1. A touch display panel, comprising a display region and a fan-shaped wiring region positioned below the display region, wherein the touch display panel comprises:
   a base substrate;
   a touch electrode layer formed on the base substrate and comprising a plurality of touch sensing blocks arranged in an array; and
   a plurality of touch signal lines, wherein a first end of each of the touch signal lines is electrically connected to a corresponding touch sensing block, a second end of the touch signal lines extends to the fan-shaped wiring region and is electrically connected to a touch integrated circuit located in the fan-shaped wiring region, and the touch integrated circuit is arranged along a column direction;
   wherein each of the touch sensing blocks is electrically connected to one of the touch signal lines, and the touch signal lines extend along a row direction;
   the touch signal lines comprise a plurality of first type touch signal lines and a plurality of second type touch signal lines, and a distance between a first end of each of the first type touch signal lines and the touch integrated circuit is less than a distance between a first end of each of the second type touch signal lines and the touch integrated circuit;
   each of the first type touch signal lines includes a single sub-signal line, and each of the second type touch signal lines includes at least two sub-signal lines;
   a number of the touch sensing blocks arranged along the row direction is N, a number of the first type touch signal lines corresponding to the touch sensing blocks is P, and a number of the second type touch signal lines corresponding to the touch sensing blocks is Q, wherein N, P, and Q are all positive integers, and N=P+Q;
   each row of the touch signal lines comprises a blind region in the column direction, a blind region width of the blind region is W, and a number of the touch signal lines in one blind region is t, wherein t is a positive integer and t≤N;
   the touch display panel comprises a pixel array layer, the pixel array layer comprises a plurality of sub-pixel units arranged in an array; and
   a vertical projection of the touch sensing blocks projected on the pixel array layer covers multiple ones of the sub-pixel units, the second type touch signal lines are grid metal patterns, and a vertical projection of each of the second type touch signal lines projected on the pixel array layer is located between two neighboring rows of the sub-pixel units and located at one side of an area of the touch sensing blocks.

2. The touch display panel as claimed in claim 1, wherein when N=2n, P=Q=n; and
   when N=2n+1, P=n+1, and Q=n, wherein n is a positive integer.

3. The touch display panel as claimed in claim 1, wherein the sub-pixel units are one of a red sub-pixel unit, a green sub-pixel unit, or a blue sub-pixel unit.

4. The touch display panel as claimed in claim 3, wherein a vertical projection of each of the touch signal lines projected on the pixel array layer is located between two adjacent rows of the sub-pixel units.

5. The touch display panel as claimed in claim 3, wherein a pixel arrangement of the sub-pixel units is a diamond pixel arrangement or a 2-in-1 pixel arrangement.

6. The touch display panel as claimed in claim 1, wherein the touch sensing blocks and the touch signal lines are both formed of a same metal layer, and the touch signal lines are grid metal patterns.

7. The touch display panel as claimed in claim 1, wherein the touch integrated circuit is configured to provide touch driving signals and detect touch signals.

8. A touch display panel, comprising a display region and a fan-shaped wiring region positioned below the display region, wherein the touch display panel comprises:
   a base substrate;
   a touch electrode layer formed on the base substrate and comprising a plurality of touch sensing blocks arranged in an array; and
   a plurality of touch signal lines, wherein a first end of each of the touch signal lines is electrically connected to a corresponding touch sensing block, a second end of the touch signal lines extends to the fan-shaped wiring region and is electrically connected to a touch integrated circuit located in the fan-shaped wiring region, and the touch integrated circuit is arranged along a column direction;
   wherein the touch signal lines comprise a plurality of first type touch signal lines and a plurality of second type touch signal lines, and a distance between a first end of each of the first type touch signal lines and the touch integrated circuit is less than a distance between a first end of each of the second type touch signal lines and the touch integrated circuit;
   each of the first type touch signal lines includes a single sub-signal line, and each of the second type touch signal lines includes at least two sub-signal lines;

a number of the touch sensing blocks arranged along the row direction is N, a number of the first type touch signal lines corresponding to the touch sensing blocks is P, and a number of the second type touch signal lines corresponding to the touch sensing blocks is Q, wherein N, P, and Q are all positive integers, and N=P+Q;

each row of the touch signal lines comprises a blind region in the column direction, a blind region width of the blind region is W, and a number of the touch signal lines in one blind region is t, wherein t is a positive integer and t≤N;

the touch display panel comprises a pixel array layer, the pixel array layer comprises a plurality of sub-pixel units arranged in an array; and a vertical projection of the touch sensing blocks projected on the pixel array layer covers multiple ones of the sub-pixel units, the second type touch signal lines are grid metal patterns, and a vertical projection of each of the second type touch signal lines projected on the pixel array layer is located between two neighboring rows of the sub-pixel units and located at one side of an area of the touch sensing blocks.

9. The touch display panel as claimed in claim 8, wherein when N=2n, P=Q=n; and when N=2n+1, P=n+1, and Q=n, wherein n is a positive integer.

10. The touch display panel as claimed in claim 8, wherein the sub-pixel units are one of a red sub-pixel unit, a green sub-pixel unit, or a blue sub-pixel unit.

11. The touch display panel as claimed in claim 10, wherein a vertical projection of each of the touch signal lines projected on the pixel array layer is located between two adjacent rows of the sub-pixel units.

12. The touch display panel as claimed in claim 10, wherein a pixel arrangement of the sub-pixel units is a diamond pixel arrangement or a 2-in-1 pixel arrangement.

13. The touch display panel as claimed in claim 8, wherein the touch sensing blocks and the touch signal lines are both formed of a same metal layer, and the touch signal lines are grid metal patterns.

14. The touch display panel as claimed in claim 8, wherein the touch integrated circuit is configured to provide touch driving signals and detect touch signals.

* * * * *